L. HOFMEISTER.
AUTOMOBILE TIRE.
APPLICATION FILED FEB. 9, 1918.

1,279,694.

Patented Sept. 24, 1918.

Inventor
Leo Hofmeister
By Morsell, Keeney & French.
Attorneys.

UNITED STATES PATENT OFFICE.

LEO HOFMEISTER, OF MILWAUKEE, WISCONSIN.

AUTOMOBILE-TIRE.

1,279,694.

Specification of Letters Patent.  Patented Sept. 24, 1918.

Application filed February 9, 1918. Serial No. 216,176.

*To all whom it may concern:*

Be it known that I, LEO HOFMEISTER, a citizen of the United States, and resident of Milwaukee, in the county of Milwaukee and State of Wisconsin, have invented new and useful Improvements in Automobile-Tires, of which the following is a description, reference being had to the accompanying drawings, which are a part of this specification.

The invention relates to pneumatic tires and has for its object to provide a puncture-proof construction and one in which the casing is relieved to a great extent of side strain.

The invention is further designed to provide an automobile tire having an outer casing, an inner casing of limited expansibility, a layer or intermediate mass of yielding material, such as sponge rubber composition of some depth interposed between said inner and outer casings, and a pneumatic inner tube which when inflated holds the inner casing against the yielding material adjacent the tread portion of the outer casing and thereby holds said outer casing in tension.

In the usual pneumatic tire construction the outer casing resists or limits the outward expansion of the inner tube. In the present invention the inner casing of limited expansibility limits the outward expansion of the inner tube and the outer casing is simply a tread member which will readily yield in all directions under strain in a manner similar to the outer casing of the usual pneumatic tire constructions.

The invention further consists in the several features hereinafter set forth.

Figure 1:
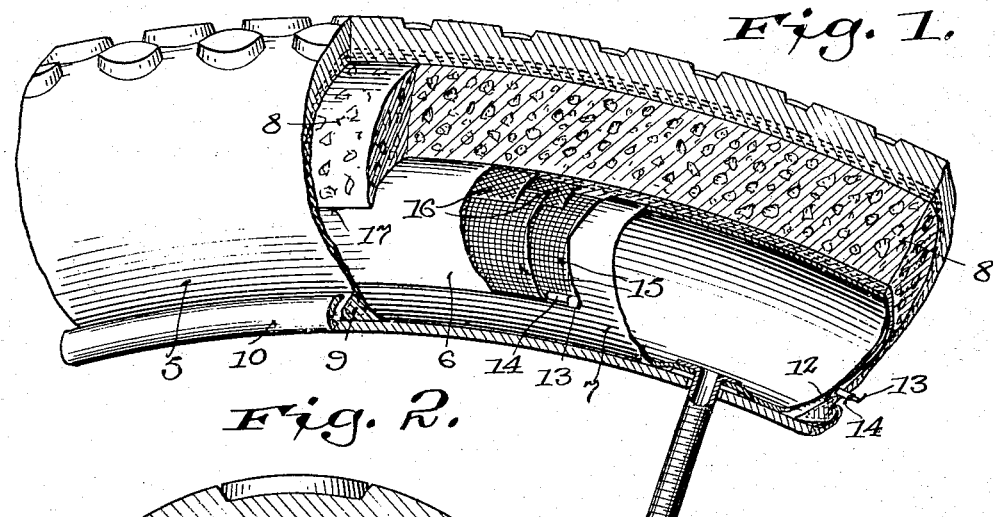
Figure 1 is a side view of a portion of the tire embodying the invention, parts being broken away and parts being shown in section.

In general the tire consists of an outer casing 5, an inner casing 6, an inner tube 7 within the casing 6, and an intermediate layer of sponge rubber or other yielding material 8 disposed between the outer casing 5 and inner casing 6.

The outer casing 5 may be of any desired construction and is preferably of the type readily removable from the rim, the drawings showing said casing provided with circumferential edges 9 which are hooked under or held by the curved flanges of the rim 10 so that when the tire is inflated the outer casing will be firmly in place upon the rim and on deflation readily removed from said rim.

Figure 3:
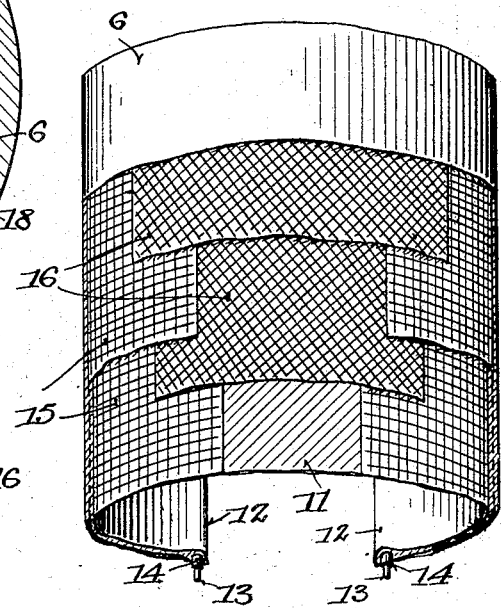
Fig. 3 is a detail plan view of the inner casing, parts being removed.
Figure 4:
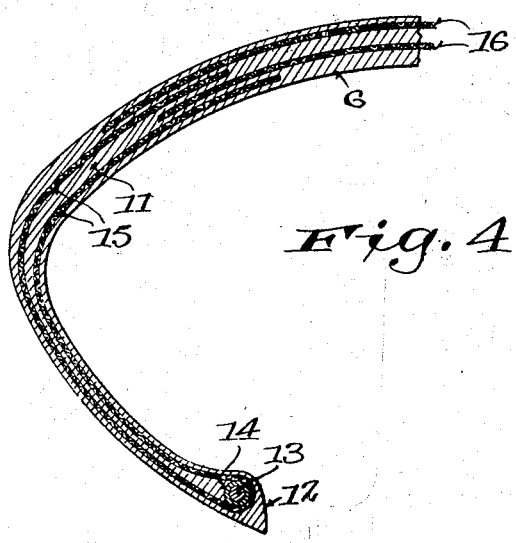
Fig. 4 is a detail sectional view of the inner casing.

The inner casing 6 is made up of fabric portions and rubber 11 vulcanized together to form a casing of limited expansibility, said casing being of less diameter than the outer casing so as to be disposed within it and be spaced from the tread portion of the outer casing and under normal conditions from the sides of said outer casing when inflated. This inner casing at its inner edges 12 has circumferentially extending wires 13 surrounded by rubber tube 14 embedded in said edges and layers 15 of friction cloth in its sides which friction cloth has no appreciable expansibility transversely of the casing and layers 16 of breaker cloth cut on the bias, as shown in Fig. 3, to provide for limited expansibility transversely of said casing, the cloth layers overlapping each other as shown in Fig. 4 and being impregnated with rubber and vulcanized in the usual manner to form a homogeneous structure. With this construction of casing the inner edges 12 are held in place within the outer casing by the wires 13 and the layers 15 at the upper portion of said casing permit of limited expansibility.

Disposed within the inner casing 6 is the usual inner tube 7, the edges 12 of said inner casing being spaced apart to permit ready insertion of said tube.

The intermediate layer of yielding material 8 is preferably a spongy rubber composition which is interposed between the outer casing 5 and inner casing 6 to substantially fill the space therebetween, the lower portion 17 of said composition being curved to conform to the curve of the casing 6 and there being normally an air space 18 left between the inner and outer casings adjacent the rim 10 when the inner tube 7 is inflated. This material may be secured to the outer casing or be removable therefrom as desired.

Figure 2:
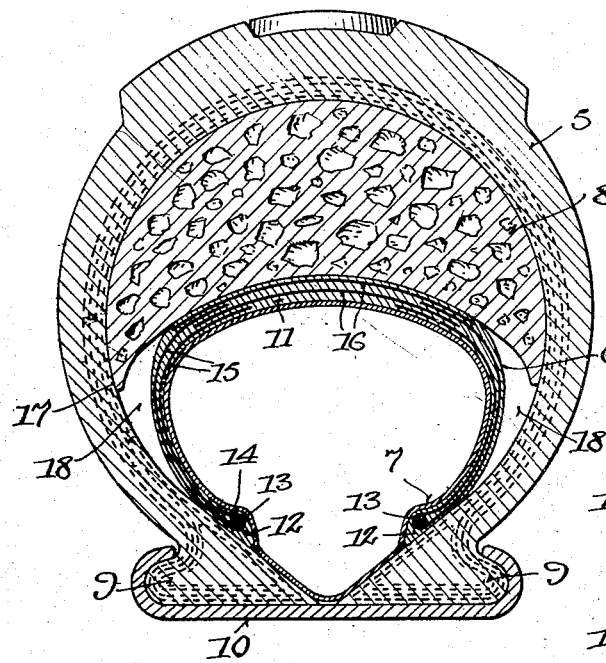
Fig. 2 is a vertical sectional view of the tire.

With this construction of tire when the inner tube 7 is inflated as shown in Fig. 2 it will fill the space bounded by the inner casing 6 and due to the non-expansibility of the sides of the inner casing and the limited expansibility of the top portion of said casing, said tube will press upwardly against the spongy intermediate portion 8 which in turn will exert pressure against the outer casing 5 to hold it in tension and thus keep it on the rim. In view of the spongy composition beneath the tread of the outer casing and the inner casing, it will be very difficult for any sharp element such as nails or tacks to pierce the inner tube 7. Also since the inner casing sustains the pressure of the inner tube and limits its expansibility the outer casing is relieved of side strains and thus side blow outs are prevented. Furthermore, the outer casing becomes simply a tread member the parts of which are in tension in the radial direction of the rim and the formation of the air space 18 between the inner and outer tires prevents puncture of the inner tube from the sides of the outer casing and also allows the inner casing to be compressed laterally under heavy pressures without transmitting these pressures against the sides of the outer casing.

It will also be noted when the tire is inflated and meets with an obstruction tending to flatten the tread, that the outer casing will be free to stretch laterally because of the local compressibility of the sponge rubber and under ordinary shocks the inner casing and tube will be little affected if at all because of the deadening or absorption of these shocks by the intermediate composition.

I am aware that the details of construction herein shown and described are subject to some modification and change and I therefore desire it to be understood that such changes in construction as come within the scope of the appended claims I deem to be within the spirit of my invention.

What I claim as my invention is:

1. In a tire, the combination, with an outer casing, an inner casing disposed within the outer casing and spaced from the tread portion thereof, said inner casing having inextensible inner peripheral edges, substantially inexpansible sides and a crown portion of limited expansibility, a pneumatic tube within said inner casing and exerting a pressure outwardly against the crown portion of the inner casing when expanded to hold the outer casing in tension, and a layer of yielding material interposed between the tread portion of the outer casing and the crown portion of the inner casing.

2. In a tire, the combination of an outer casing, a separate inner casing of limited expansibility and less tubular diameter than the outer casing to space said inner casing from the sides and tread portions of the outer casing, a layer of sponge composition interposed between said inner and outer casings but only partially filling the space therebetween to form side air spaces when the tire is inflated, and a pneumatic inner tube within said inner casing.

3. In a tire, the combination of an outer casing, a separate inner casing having sides substantially inexpansible and a crown portion of limited expansibility transversely of said casing, a layer of yielding material interposed between said casings to space said inner casing from the tread portion of the outer casing and a pneumatic tube within said inner casing to hold said inner casing under pressure and thereby hold the outer casing in tension and relieve said outer casing of side strain from the expansion of said inner tube.

In testimony whereof, I affix my signature.

LEO HOFMEISTER.